US012486472B2

(12) United States Patent
Murphy et al.

(10) Patent No.: US 12,486,472 B2
(45) Date of Patent: Dec. 2, 2025

(54) CONCENTRATED LIQUID ESTERQUAT COMPOSITIONS

(71) Applicant: Stepan Company, Northbrook, IL (US)

(72) Inventors: Dennis S. Murphy, Libertyville, IL (US); Kathryn E. Merwin, Palatine, IL (US); Teresa Germain, Orland Park, IL (US); Patrick Shane Wolfe, Palatine, IL (US); Sebastian Flieger, Elk Grove Village, IL (US)

(73) Assignee: Stepan Company, Northbrook, IL (US)

( * ) Notice: Subject to any disclaimer, the term of this patent is extended or adjusted under 35 U.S.C. 154(b) by 484 days.

(21) Appl. No.: 17/976,315

(22) Filed: Oct. 28, 2022

(65) Prior Publication Data

US 2023/0068208 A1 Mar. 2, 2023

Related U.S. Application Data

(63) Continuation of application No. PCT/US2021/029118, filed on Apr. 26, 2021.

(60) Provisional application No. 63/017,976, filed on Apr. 30, 2020.

(51) Int. Cl.

| | |
|---|---|
| ***C11D 1/62*** | (2006.01) |
| ***C11D 3/00*** | (2006.01) |
| ***C11D 3/32*** | (2006.01) |
| ***C11D 3/37*** | (2006.01) |
| ***C11D 3/43*** | (2006.01) |

(52) U.S. Cl.

CPC .............. *C11D 1/62* (2013.01); *C11D 3/0015* (2013.01); *C11D 3/32* (2013.01); *C11D 3/3707* (2013.01); *C11D 3/43* (2013.01); *C11D 2111/12* (2024.01)

(58) Field of Classification Search

CPC ........... C11D 1/62; C11D 3/0015; C11D 3/32; C11D 3/3707; C11D 3/43; C11D 2111/12

See application file for complete search history.

(56) References Cited

U.S. PATENT DOCUMENTS

| | | | | |
|---|---|---|---|---|
| 3,806,460 | A | 4/1974 | Mukai et al. | |
| 2003/0013630 | A1 | 1/2003 | Ishikawa et al. | |
| 2003/0139312 | A1* | 7/2003 | Caswell ................ | C11D 3/373 510/320 |
| 2010/0113325 | A1 | 5/2010 | Kang et al. | |
| 2014/0366282 | A1 | 12/2014 | Murphy et al. | |
| 2015/0329799 | A1 | 11/2015 | Schramm, Jr. et al. | |
| 2016/0010029 | A1 | 1/2016 | Murphy et al. | |
| 2016/0145537 | A1* | 5/2016 | Blattner .................. | C11D 1/62 510/516 |
| 2016/0175213 | A1 | 6/2016 | Shapiro et al. | |
| 2017/0211019 | A1* | 7/2017 | Sivik .................... | C11D 3/3749 |
| 2018/0071198 | A1* | 3/2018 | Lin .......................... | A61K 8/85 |
| 2019/0112563 | A1* | 4/2019 | Piorkowski .............. | C11D 1/83 |

FOREIGN PATENT DOCUMENTS

| | | | | |
|---|---|---|---|---|
| EP | 0691396 | A2 | 1/1996 | |
| JP | 2001-526680 | A | 12/2001 | |
| JP | 2005-524760 | | 8/2005 | |
| JP | 2006-516665 | A | 6/2006 | |
| WO | 9734976 | | 9/1997 | |
| WO | 1998/41604 | A1 | 9/1998 | |
| WO | 9852907 | | 11/1998 | |
| WO | 2000/49123 | A1 | 8/2000 | |
| WO | 0185892 | | 11/2001 | |
| WO | 2004069981 | A2 | 8/2004 | |
| WO | 03097778 | A1 | 8/2005 | |
| WO | 2013070824 | | 5/2013 | |
| WO | WO-2014143182 | A1 * | 9/2014 | ............. C07C 13/02 |
| WO | 2018/237102 | A1 | 12/2018 | |

OTHER PUBLICATIONS

First Office Action for JP Application No. 2022-566023, dated Mar. 7, 2025, 6 pages.

International Searching Authority, International Search Report and Written Opinion, Application No. PCT/US21/29118, mailed Jul. 21, 2021, 19 pages.

First Office Action, Chinese Patent Application No. 202180031513.7, dated Jun. 6, 2024, 9 pages.

Supplemental Partial European Search Report, European Patent Application No. 21 796 770.2, dated May 15, 2024, 17 pages.

Preliminary Office Action for Brazil Patent Application No. 112022021654-8, dated Jun. 3, 2025, 7 pages.

* cited by examiner

*Primary Examiner* — Angela C Brown-Pettigrew
*Assistant Examiner* — Brittany Sharon Harris
(74) *Attorney, Agent, or Firm* — McAndrews, Held & Malloy, Ltd.

(57) ABSTRACT

Clear, stable concentrated liquid compositions are disclosed that comprise from 30% to 90% by weight of an esterquat active, and from 10% to 50% by weight of a particular solvent system. The esterquat active is the quaternized reaction product of a fatty acyl source having an Iodine Value of 40 to 130 reacted with an alkanolamine at a fatty acyl to alkanolamine molar ratio of 1.0:1 to 2.2:1. The concentrated liquid compositions have a VOC content of less than 5%, a Biorenewable Carbon Index (BCI) of at least 20 and a viscosity of less than 5000 cP at 25° C. The concentrated liquid compositions can be easily diluted in water to form stable aqueous dispersions.

20 Claims, No Drawings

CONCENTRATED LIQUID ESTERQUAT COMPOSITIONS

CROSS-REFERENCE TO RELATED APPLICATIONS

This application is a continuation of and claims priority to PCT Application No. US2021/029118, filed Apr. 26, 2021, which claims priority to U.S. Provisional Application No. 63/017,976, filed Apr. 30, 2020. The entire specifications of the PCT and provisional application referred to above are hereby incorporated by reference.

FIELD OF THE INVENTION

The present technology relates to clear, concentrated esterquat compositions that are chemically stable, storage stable, and employ esterquat actives that are biodegradable and water-dispersible in the compositions. The concentrated liquid compositions can be used without dilution, or can be easily dispersed in water to form stable liquid dispersions. The concentrated liquid esterquat compositions are particularly useful in fabric softening applications.

BACKGROUND OF THE INVENTION

Liquid fabric softening compositions that soften fabrics in the rinse cycle are known. Such compositions commonly comprise an amount of softener active in the range of about 5% to about 15% by weight, with the remainder being mainly water. More concentrated compositions, i.e. those having an actives amount greater than 15%, are desirable since these require less packaging and therefore have a smaller environmental impact due to, for example, reduced transportation costs and less waste production.

One problem associated with concentrated fabric softening compositions is that the product is not stable upon storage, especially when stored at high temperatures or at freezing temperatures. Instability can manifest itself as thickening of the product upon storage, even to the point that the product is no longer pourable. As a result, typical commercially available liquid fabric softener compositions today have a softener actives concentration of about 15% by weight or less.

Another problem with concentrated fabric softening compositions is that they typically require a solvent in order to achieve acceptable concentrated aqueous dispersions. The addition of a solvent is also usually required in order to have a product that has a low enough viscosity in its molten state that it is able to be pumped with conventional equipment. The added solvent is usually a volatile organic compound (VOC), such as isopropanol or ethanol, which is undesirable from an environmental standpoint. Moreover, stricter regulations limiting VOCs have been proposed, making it important to limit or eliminate solvents that contribute VOCs.

There is also a trend in the consumer products market to formulate products with ingredients that are based on renewable resources derived from plants or animals, rather than fossil fuels. Such ingredients are considered "green" or "natural", since they are derived from renewable and/or sustainable sources. As a result, they are more environmentally friendly than ingredients derived from fossil fuels. An ingredient having a high Biorenewable Carbon Index (BCI), such as greater than 80, indicates that the ingredient contains carbons that are derived primarily from plant, animal or marine-based sources.

There is a need for a highly concentrated fabric softener active system that can remain stable in concentrated form during storage, yet can also be easily diluted in water at room temperature to form a stable fabric softening dispersion without gelling. There is also a need for stable, concentrated liquid fabric softener compositions having ingredients that can be made from renewable resources, and that do not require a VOC solvent.

SUMMARY OF THE INVENTION

In a first aspect, the present technology provides a clear, stable liquid composition comprising: (A) from about 30% to about 80% by weight, based on the weight of the composition, of one or more esterquats, wherein the one or more esterquats are the quaternized reaction product of a fatty acyl source having an Iodine Value of 40 to 130, reacted with an alkanolamine at a fatty acyl to alkanolamine molar ratio of about 1.0:1 to about 2.2:1; (B) from about 20% to about 50% by weight, based on the weight of the composition, of a solvent system, wherein the solvent system comprises (i) a mixture of one or more polyethylene glycols having a number average molecular weight between 130 and 700 and one or more fatty amides having the following general structure

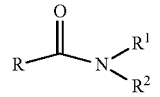

wherein R has from 6 to 20 carbon atoms, is branched or straight, saturated or has unsaturated double bonds, optionally containing one or more hydroxyl groups (a hydroxyl group is an —OH group); and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present; and (C) optionally, 0 up to 30% by weight water; wherein the composition has a measured viscosity of less than 5000 cP at 25° C.

In another aspect, the present technology provides a clear, stable liquid composition comprising (A) from about 30% to about 90% by weight, based on the weight of the composition, of one or more esterquats, wherein the one or more esterquats are the quaternized reaction product of a fatty acyl source having an Iodine Value of 40 to 130, reacted with an alkanolamine at a fatty acyl to alkanolamine molar ratio of about 1.0:1 to about 2.2:1; (B) from about 10% to about 50% by weight, based on the weight of the composition, of a solvent system comprising a mixture of one or more glycol ethers selected from the group consisting of 2-butoxyethanol, 2-phenoxyethanol, 2-benzyloxyethanol, 2 (2-methoxyethoxy) ethanol, 2 (2-ethoxyethoxy) ethanol, dipropylene glycol monomethyl ether, dibutoxyethane, and combinations thereof, and one or more fatty amides having the following general structure:

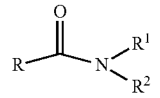

wherein R has from 6 to 20 carbon atoms, is branched or straight, saturated or has unsaturated double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present; and (C) optionally, 0 up to 30% by weight water; wherein, the composition has a measured viscosity of less than 5000 cP at 25° C.

In another aspect, the present technology provides a clear, stable composition comprising (A) from about 30% to about 90% by weight, based on the weight of the composition, of one or more esterquats, wherein the one or more esterquats are the quaternized reaction product of a fatty acyl source having an Iodine Value of 40 to 130, and an alkanolamine at a fatty acyl to alkanolamine molar ratio of about 1.0:1 to about 2.2:1; (B) from about 10% to about 50% by weight, based on the weight of the composition, of a solvent system, wherein the solvent system comprises one or more 1,3-dialkoxy-2-propanols having the following general formula:

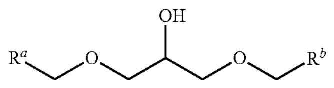

wherein $R^a$ and $R^b$ are independently a C1 to C6 alkyl group, or a C2 to C6 alkenyl group, optionally containing one or more hydroxyl groups, and can optionally be branched when 3 or more carbon atoms are present; and (C) optionally, 0 up to 30% by weight water; wherein, the composition has a measured viscosity of less than 5000 cP at 25° C.

In another aspect, the present technology provides a clear, stable composition comprising (A) from about 55% to about 85% by weight, based on the weight of the composition, of one or more esterquats, wherein the one or more esterquats are the quaternized reaction product of a fatty acyl source having an Iodine Value of 40 to 130, and an alkanolamine at a fatty acyl to alkanolamine molar ratio of about 1.0:1 to about 2.2:1; and (B) from about 15% to about 45% by weight, based on the weight of the composition, of a solvent system comprising one or more fatty amides having the following general structure:

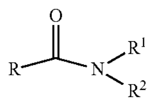

wherein R has from 6 to 20 carbon atoms, is branched or straight, saturated or has unsaturated double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present, and (C) optionally, 0 up to 10% by weight water, wherein the composition has a measured viscosity of less than 5000 cP at 25° C.

In a further aspect, the present technology relates to a method of forming a fabric softener composition, comprising the steps of: (A) providing a concentrated fabric softening composition, wherein the concentrated fabric softening composition comprises (i) from about 30% to about 80% by weight, based on the weight of the concentrated fabric softening composition, of one or more esterquat actives, wherein the one or more esterquat actives are the quaternized reaction product of a fatty acyl source having an Iodine Value of 40 to 130, reacted with an alkanolamine at a fatty acyl to alkanolamine molar ratio of about 1.0:1 to about 2.2:1; (ii) from about 20% to about 50% by weight, based on the weight of the concentrated fabric softening composition, of a solvent system, wherein the solvent system comprises a mixture of one or more polyethylene glycols having a number average molecular weight between 130 and 700, and one or more fatty amides having the following general structure:

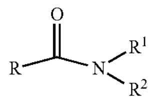

wherein R has from 6 to 20 carbon atoms, is branched or straight, saturated or has unsaturated double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present; and (iii) optionally, 0 up to 30% by weight water; wherein, the concentrated fabric softening composition has a measured viscosity of less than 5000 cP at 25° C.; and (B) mixing the concentrated fabric softening composition in water to form a stable aqueous dispersion comprising from 2% to 22% by weight esterquat actives, based on the total weight of the dispersion, thereby forming the fabric softener composition.

In a still further aspect, the present technology provides a method of forming a fabric softener composition, comprising the steps of: (A) providing a concentrated fabric softening composition, wherein the concentrated fabric softening composition comprises (i) from about 30% to about 90% by weight, based on the weight of the concentrated fabric softening composition, of one or more esterquat actives, wherein the one or more esterquat actives are the quaternized reaction product of a fatty acyl source having an Iodine Value of 40 to 130, reacted with an alkanolamine at a fatty acyl to alkanolamine molar ratio of about 1.0:1 to about 2.2:1; (ii) from about 10% to about 50% by weight, based on the weight of the concentrated fabric softening composition, of a solvent system, wherein the solvent system comprises one or more 1,3-dialkoxy-2-propanols having the following general formula:

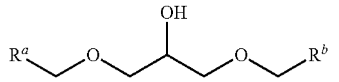

wherein $R^a$ and $R^b$ are independently a C1 to C6 alkyl group, or a C2 to C6 alkenyl group, optionally containing one or more hydroxyl groups, and can optionally be branched when 3 or more carbon atoms are present; and (C) optionally, 0 up to 30% by weight water; wherein, the concentrated fabric softening composition has a measured viscosity of less than 5000 cP at 25° C.; and (B) mixing the concentrated fabric softening composition in water to form a stable aqueous dispersion comprising from 2% to 22% by weight esterquat actives, based on the total weight of the dispersion, thereby forming the fabric softener composition.

In a still further aspect, the present technology provides a method of forming a fabric softener composition, comprising the steps of: (A) providing a concentrated fabric softening composition, wherein the concentrated fabric softening composition comprises (i) from about 30% to about 90% by weight, based on the weight of the concentrated fabric softening composition, of one or more esterquat actives, wherein the one or more esterquat actives are the quaternized reaction product of a fatty acyl source having an Iodine Value of 40 to 130, reacted with an alkanolamine at a fatty acyl to alkanolamine molar ratio of about 1.0:1 to about 2.2:1; (ii) from about 10% to about 50% by weight, based on the weight of the concentrated fabric softening composition, of a solvent system, wherein the solvent system comprises comprising a mixture of one or more glycol ethers selected from the group consisting of 2-butoxyethanol, 2-phenoxyethanol, 2-benzyloxyethanol, 2 (2-methoxyethoxy) ethanol, 2 (2-ethoxyethoxy) ethanol, dipropylene glycol monomethyl ether, dibutoxyethane, and combinations thereof, and one or more fatty amides having the following general structure:

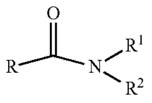

wherein R has from 6 to 20 carbon atoms, is branched or straight, saturated or has unsaturated double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present; and (C) optionally, 0 up to 30% by weight water; wherein, the composition has a measured viscosity of less than 5000 cP at 25° C., and (B) mixing the concentrated fabric softening composition in water to form a stable aqueous dispersion comprising from 2% to 22% by weight esterquat actives, based on the total weight of the dispersion, thereby forming the fabric softener composition.

In an additional aspect, the present technology relates to a method of forming a fabric softener composition, comprising the steps of: (A) providing a concentrated fabric softening composition, wherein the concentrated fabric softening composition comprises (i) from about 55% to about 85% by weight, based on the weight of the concentrated fabric softening composition, of one or more esterquat actives, wherein the one or more esterquat actives are the quaternized reaction product of a fatty acyl source having an Iodine Value of 40 to 130, reacted with an alkanolamine at a fatty acyl to alkanolamine molar ratio of about 1.0:1 to about 2.2:1; (ii) from about 15% to about 45% by weight, based on the weight of the concentrated fabric softening composition, of a solvent system comprising one or more fatty amides having the following general structure:

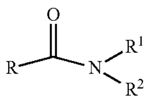

wherein R has from 6 to 20 carbon atoms, is branched or straight, saturated or has unsaturated double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present, and (iii) optionally 0 up to 10% by weight water, wherein the concentrated fabric softening composition has a measured viscosity of less than 5000 cP at 25° C.; and (B) mixing the concentrated fabric softening composition in water to form a stable aqueous dispersion comprising from 2% to 22% by weight esterquat actives, based on the total weight of the dispersion, thereby forming the fabric softener composition.

BRIEF DESCRIPTION OF SEVERAL VIEWS OF THE DRAWINGS

[Not Applicable]

DETAILED DESCRIPTION OF THE INVENTION

While the presently described technology will be described in connection with one or more preferred embodiments, it will be understood by those skilled in the art that the technology is not limited to only those particular embodiments. To the contrary, the presently described technology includes all alternatives, modifications, and equivalents as may be included within the spirit and scope of the appended claims.

Definitions

"Biorenewable Carbon Index" (BCI) refers to a calculation of the percent carbon derived from a biorenewable resource, and is calculated based on the number of biorenewable carbons divided by the total number of carbons in the entire molecule.

"Biorenewable" is defined herein as originating from animal, plant, or marine material.

A "clear" or "transparent" composition is defined as one having a percent transmittance of light of greater than about 50 using a 1 centimeter cuvette at a wavelength of 420 nanometers wherein the composition is measured in the absence of dyes and opacifiers at 25° C. Alternatively, transparency of the composition may be measured as having an absorbance (A) at 420 nanometers of less than about 0.3, which is equivalent to percent transmittance of greater than about 50 using the same cuvette as above. The relationship between absorbance and percent transmittance is:

$$\text{Percent Transmittance}=100(1/\text{inverse log } A)$$

"VOC" refers to volatile organic compounds. Such compounds have a vapor pressure of greater than 2 mm Hg at 25° C., less than 7 carbon atoms, and a boiling point at atmospheric pressure of less than 120° C.

Esterquat Fabric Softener Compounds

The concentrated liquid compositions of the present technology comprise, as a principal active, an esterquat cationic material that is the quaternized reaction product of a fatty acyl source reacted with an alkanolamine. In general, the esterquat actives of the present technology are prepared by combining a natural oil or other fatty acid source and an alkanolamine, typically at a starting temperature at which the natural oil or fatty acid source is a liquid or molten, optionally adding a catalyst, then heating the reaction mixture until the desired esteramine reaction product, verified by acid value and alkalinity value, is obtained. The fatty acid source is reacted with alkanolamine at a molar ratio of fatty acyl groups to alkanolamine of about 1.0:1 to about 2.2:1 to form the esteramine intermediate. The esteramine intermediate is then quaternized using an alkylating agent, yielding an esterquat product. Alkylating agents for preparing the esterquats are known in the art and include, for example, dimethyl sulfate, methyl chloride, diethyl sulfate, benzyl chloride, ethyl benzyl chloride, methyl bromide, and epichlorohydrin. The resulting esterquat product is a mixture of quaternized mono-ester, di-ester, and, depending on the starting alkanolamine, tri-ester components, and optionally, some amount of one or more reactants, intermediates, and byproducts, including but not limited to free amine and free fatty acid or parent fatty acyl compounds, or derivatives thereof.

The fatty acyl source for preparing the esterquats can be a variety of starting materials, such as free fatty acids, fatty acid esters, or acid chlorides corresponding to fatty acids. The free fatty acids can be separate, such as a single purified fatty acid, or in combinations, such as fatty acid mixtures characteristic of the fatty acid constituents of glyceride esters in natural oils. Fatty acid esters can be glycerides, such as mono-, di- and/or triglycerides, or alkyl esters of fatty acids, such as methyl esters or ethyl esters of fatty acids. The fatty acid esters can be derived from a single fatty acid, or mixtures of fatty acids, such as those derived from natural fatty acid feedstocks or from natural oils. In some embodiments, fatty acids, or alkyl ester derivatives thereof, are preferred over natural oils as the fatty acyl source.

The esterquats may be prepared from C8-32 fatty acids, or alkyl ester derivatives thereof, that are saturated, unsaturated or a mixture of saturated and unsaturated fatty acids. Preferred fatty acids are those having carbon chain lengths of 16 to 20 carbon atoms. The fatty acids may be derived from various sources such as, for example, sunflower, canola, corn, cottonseed, flaxseed, peanut, meadowfoam, soybean, walnut, jojoba, palm, borage, safflower, or rapeseed, or mixtures thereof. In some embodiments, the fatty acids are derived from canola oil or low erucic acid rapeseed oil (LEAR). Preferred fatty acids comprise at least 50% by weight, alternatively at least 60% by weight unsaturated fatty acid groups having at least one carbon-carbon double bond, and have an Iodine Value in the range of 40 to 130, preferably 50 to 130, more preferably 60 to 130.

The iodine value represents the mean iodine value of the parent fatty acyl compounds or fatty acids of all of the esterquat materials present. In the context of the present technology, the iodine value is defined as the number of grams of iodine that react with 100 grams of the parent compound. The method for calculating the iodine value of a parent fatty acyl compound/acid is known in the art and comprises dissolving a prescribed amount (from 0.1-3 g) into about 15 ml chloroform. The dissolved parent fatty acyl compound/fatty acid is then reacted with 25 ml of iodine monochloride in acetic acid solution (0.1M). To this, 20 ml of 10% potassium iodide solution and about 150 ml deionized water are added. After addition of the halogen has taken place, the excess of iodine monochloride is determined by titration with sodium thiosulfate solution (0.1M) in the presence of a blue starch indicator powder. At the same time, a blank is determined with the same quantity of reagents and under the same conditions. The difference between the volume of sodium thiosulfate used in the blank and that used in the reaction with the parent fatty acyl compound or fatty acid enables the iodine value to be calculated.

The amount of unsaturated fatty acid groups in the esterquat may have an influence on the ability to obtain concentrated liquid compositions that remain stable. Esterquats made from fatty acid feedstocks having an average Iodine Value of less than about 40 can result in concentrated liquid compositions that are unstable.

The alkanolamines useful in preparing the esterquat active generally correspond to the following general formula:

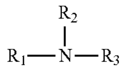

where $R^1$, $R^2$ and $R_5$ are independently selected from C1-C6 alkyl or hydroxy alkyl groups. Suitable alkanolamines include triethanol amine (TEA), methyl diethanolamine (MDEA), ethyl diethanolamine, dimethyl amino-N-(2,3-propanediol), diethylamino-N-(2,3-propanediol), methylamino-N-2-ethanol-N-2,3-propanediol, and ethylamino-N-2-ethanol-N-2,3-propanediol, and mixtures thereof. The molar ratio of fatty acid to alkanolamine is about 1.0:1 to about 2.2:1. In some embodiments, the alkanolamine is triethanolamine (TEA), and the molar ratio of fatty acid groups to TEA is about 1.3:1 to about 2.2:1, alternatively about 1.3:1 to 1.8:1. In other embodiments, the alkanolamine is MDEA, and the molar ratio of fatty acid groups to MDEA is about 1.0:1 to about 2.0:1.

Preferred esterquats are the TEA-based esterquats having the following chemical structure:

(Formula I)

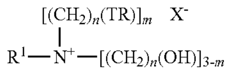

Each R is independently selected from a C5-31 alkyl or alkenyl group, alternatively a C7-21 alkyl or alkenyl group, alternatively a C11-21 alkyl or alkenyl group, alternatively an at least predominantly C13-17 alkyl or alkenyl group, and can be straight or branched. Preferably the compounds of Formula I contain different R groups that are derived from a fatty acid material having an average Iodine Value of 60 to 130. R1 represents a C1-4 alkyl or hydroxyalkyl group or a C2-4 alkenyl group, T is 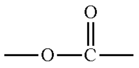 or 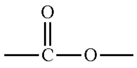

(i.e. a forward or reverse ester linkage); n is an integer selected from 0 to 4, alternatively from 2 to 4; m is 1 for a mono-esterquat, 2 for a di-esterquat, or 3 for a tri-esterquat, and denotes the number of moieties to which it refers that pend directly from the N atom, and X is an ionic group, such as a halide or alkyl sulfate, for example, a C1-4 alkyl or hydroxyalkyl sulfate or C2-4 alkenyl sulfate. Specifically contemplated anionic groups include chloride, methyl sulfate, or ethyl sulfate.

The concentrated liquid compositions comprise from about 30% to about 90% by weight, alternatively about 35% to about 85% by weight, alternatively about 40% to about 80% by weight, alternatively about 45% to about 75% by weight, alternatively about 45% to about 70% by weight, alternatively about 50% to about 60% by weight, alternatively about 55% to about 85% by weight, of the esterquat active, based on the total weight of the composition.

Solvents

The concentrated liquid compositions also comprise from about 10% to about 50% by weight, alternatively about 15% to about 45%, alternatively about 20% to about 40% by weight, alternatively, about 25% to about 35% by weight, of a solvent system comprising one or more solvents. An important aspect of the present technology is that the solvent system used in the concentrated fabric softening compositions has a low VOC content, or is free of VOCs, and comprises solvents that are derived primarily from biorenewable sources. Conventional solvents used in fabric softening compositions, such as ethanol, propanol, and butanol, are not desirable for use in the concentrated fabric softening compositions of the present technology, since they are VOC solvents, are derived from petroleum sources, or both. However, in some embodiments, the solvent system could include a VOC solvent, provided the VOC solvent contributes no more than 5% by weight, preferably no more than 2% by weight VOCs to the concentrated fabric softening composition, based on the total weight of the composition. Preferably, only non-VOC solvents are used in the composition.

It is also desirable that selected solvents have a BCI of greater than 50, alternatively greater than 60, alternatively greater than 70, alternatively greater than 80, alternatively greater than 90. In some embodiments, a solvent having a BCI that is less than 50, including a solvent having a BCI of 0 (i.e. 100% petroleum-based), can be used in combination with a solvent having a high BCI (greater than 50) to obtain a solvent system having an overall BCI of at least 20, alternatively between 20 and 60, alternatively between 40 and 60, alternatively at least 50, alternatively at least 60.

Solvents that can be used in the solvent system include polyethylene glycols, fatty amides, 1,3-dialkoxy-2-propanols, glycol ethers, or combinations thereof. Polyethylene glycols that can be used are those having a number average molecular weight in the range of 130 to 700, alternatively 170 to 400, alternatively 190 to 300, alternatively 195 to 210. Number average molecular weight can be determined by methods known in the art, such as size exclusion chromatography. One example of a suitable polyethylene glycol (PEG) solvent is PEG 200 (also known as PEG-4), having a number average molecular weight of about 200. PEG 200 is not a VOC solvent, and is available in 100% plant-based form from Acme-Hardesty. When derived from a 100% plant-based source, PEG 200 has a BCI of 100.

The fatty amides that can be used in the solvent system have the following general structure:

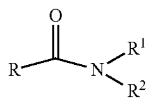

wherein R is branched or straight, saturated or unsaturated alkyl or alkenyl having from 6 to 20, preferably 8 to 14 carbon atoms, or combinations thereof. In some embodiments, R can contain one or more hydroxyl groups. $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present, or mixtures thereof. Examples of feedstocks which can be used to make the alkyl amides include lauric fatty acid, myristyl fatty acid, coconut fatty acid, soy fatty acid and ricinoleic fatty acid, or the corresponding methyl esters of these feeds. Specific examples of $R^1$ and $R^2$ groups include methyl, ethyl, and 2-propanol. Commercial examples of dialkyl amides include, but are not limited to, di-isopropyl amides available under the tradename COLAR Liquid from Colonial Chemical, Inc., and dimethyl amides commercially available from Stepan Company under the tradenames NINOL® and Hallcomid®. One example of a suitable alkyl amide is NINOL® CAA, a mixture of dimethyl lauramide and dimethyl myristamide (CAA) available from Stepan Company. CAA is derived primarily from renewable sources, has a BCI of 86, and is a non-VOC solvent. Other examples of suitable alkyl amides available from Stepan Company are HALLCOMID® M-10 (N,N-dimethylcapramide; M-10) and HALLCOMID® M-8-10 (mixture of N,N-dimethylcaprylamide N,N-dimethylcapramide; M-8-10); all the carbons in these molecules, except for the methyl groups on the nitrogen, are from plant sources. Another example is STEPOSOL® MET-10U (N,N-dimethyl 9-decenamide; MET-10U)-MET-10U is also available from Stepan Company.

The 1,3-dialkoxy-2-propanols that can be used in the solvent system have the following general structure:

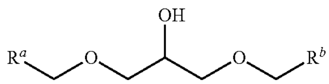

wherein $R^a$ and $R^b$ are independently a C1 to C6 alkyl group, or a C2 to C6 alkenyl group, optionally containing one or more hydroxyl groups, and can optionally be branched when 3 or more carbon atoms are present, or mixtures thereof. One example of a suitable 1,3-dialkoxy-2-propanol solvent is 1,3-diethoxy-2-propanol (DEP). DEP is not a VOC solvent, and can be prepared by synthetic routes that utilize biorenewable feedstocks rather than petroleum based feedstocks. When derived from biorenewable feedstocks, DEP has a BCI of 100.

The glycol ethers that can be used in the solvent system are preferably non-VOC, and are selected from the group consisting of 2-butoxyethanol, 2-phenoxyethanol, 2-benzyloxyethanol, 2 (2-methoxyethoxy) ethanol, 2 (2-ethoxyethoxy) ethanol, dipropylene glycol monomethyl ether, dibutoxyethane, and combinations thereof. One example of a suitable glycol ether is dipropylene glycol monomethyl ether (DPM). Although DPM has a BCI of 0, it can be combined with a solvent having a high BCI, such as CAA, so that the overall solvent system has a BCI of at least 20.

The solvents in the solvent system are selected so that the concentrated esterquat compositions are clear, chemically stable, storage stable, and water-dispersible. In some embodiments, a clear, stable, water-dispersible concentrated composition can be obtained with a solvent system that comprises a single solvent. In other embodiments, it may be necessary to use a mixture of particular solvents in order to obtain the desired stability and water-dispersibility. A concentrated liquid composition comprising a 1,3-dialkyl-2-propanol as the only solvent has been found to be stable and water-dispersible. The 1,3-dialkyl-2-propanol solvent could also be combined with one or more of the other solvents recited above to form the solvent system. In some embodiments, a stable and water-dispersible concentrated liquid composition can be obtained using a fatty amide (as defined above) as the only solvent, in an amount of about 15% to about 45% by weight of the composition. It has also been found that a solvent system comprising a mixture of at least one polyethylene glycol and at least one fatty amide, as defined above, can provide clear, stable, and water-dispersible concentrated liquid compositions. The weight ratio of polyethylene glycol to fatty amide in the solvent system can range from 1:3 to 3:1, alternatively 1:2 to 2:1. In one embodiment, the solvent system comprises a mixture of PEG 200 and CAA. A solvent system comprising a mixture of at least one glycol ether and at least one fatty amide, as defined above, can also provide a clear, stable, water-dispersible concentrated composition. In some embodiments, the weight ratio of glycol ether to fatty amide is about 2:1 in the solvent system. In one embodiment, the solvent system comprises a mixture of DPM and CAA.

The viscosity of the concentrated liquid compositions is less than 5000 cP at 25° C., preferably less than 3000 cP at 25° C., and most preferably less than 1000 cP at 25° C.

Liquid Carrier

The concentrated liquid esterquat compositions can comprise from 0% up to 30% by weight of a liquid carrier as needed to achieve a composition viscosity of less than 5,000 cP at 25° C. Water is a preferred liquid carrier due to its low cost, relative availability, safety, and environmental compatibility. It should be understood that water should not be considered part of the solvent system in any of the inventive compositions. In some embodiments, the concentrated compositions have a viscosity of less than 5,000 cP without the addition of water or other liquid carrier. In such embodiments, the composition can comprise about 50% to about 90% by weight esterquat and about 10% to about 50% by weight solvent. Concentrated liquid compositions that do not include water have good stability during long term storage, since no water is present to cause hydrolysis of the esterquat.

Optional Ingredients

It is contemplated that the concentrated liquid compositions can optionally comprise additional ingredients as desired or needed. Additional ingredients include, but are not limited to, nonionic surfactants, cationic surfactants, amphoteric surfactants, silicones, such as polydimethyl siloxane, amino silicones, or ethoxylated silicones, cationic polymers, or any combination thereof. The optional ingredients may be added to the concentrated liquid compositions in an amount of 0 to about 3% by weight of the composition.

Adjunct Ingredients

Adjunct ingredients may be added to the compositions of the present technology. The term "adjunct ingredient" includes: dispersing agents, stabilizers, pH control agents, metal ion control agents, colorants, brighteners, dyes, odor control agent, pro-perfumes, cyclodextrin, perfume, solvents, soil release agents, preservatives, antimicrobial agents, chlorine scavengers, anti-shrinkage agents, fabric crisping agents, spotting agents, anti-oxidants, anti-corrosion agents, bodying agents, drape and form control agents, smoothness agents, static control agents, wrinkle control agents, sanitization agents, disinfecting agents, germ control agents, mold control agents, mildew control agents, antiviral agents, drying agents, stain resistance agents, malodor control agents, fabric refreshing agents, chlorine bleach odor control agents, dye fixatives, dye transfer inhibitors, color maintenance agents, color restoration, rejuvenation agents, anti-fading agents, whiteness enhancers, anti-abrasion agents, wear resistance agents, fabric integrity agents, anti-wear agents, rinse aids, UV protection agents, sun fade inhibitors, insect repellents, anti-allergenic agents, enzymes, flame retardants, water proofing agents, fabric comfort agents, water conditioning agents, shrinkage resistance agents, stretch resistance agents, and combinations thereof. The adjunct components may be added to the concentrated liquid compositions in an amount of 0 to about 3% by weight of the composition.

Composition Properties

The concentrated liquid esterquat compositions of the present technology are clear, transparent, and desirably have a percent transmittance of greater than about 50 at a wavelength of 420 nanometers when measured in the absence of dyes and opacifiers at 25° C. The compositions have a measured viscosity of less than 5,000 cP at 25° C., alternatively less than 3,000 cP at 25° C., alternatively 1,000 cP at 25° C., and a VOC content of less than 2% by weight, based on the total weight of the composition. In some embodiments, the solvent system has a BCI of at least 50. The solvent systems may also allow the concentrated liquid compositions to have high loadings of perfume or fragrance ingredients, due to the solvent systems being able to incorporate hydrophobic ingredients into the composition. A high loading of perfume or fragrance ingredients would be, by weight, between about 1% and 12%, alternatively between about 2% and 8%, alternatively between about 2% and 5%.

Methods of Making Concentrated Softening Compositions

The concentrated liquid compositions of the present technology can be prepared by simply mixing the esterquat and solvent system. If water is also included in the composition, it is desirable to mix the solvent system and water together, and then add the esterquat. The mixing can be done at ambient temperature, and heating the components prior to mixing is not required. However, heating the components may be desirable for easier mixing, and for reducing the viscosity of the esterquat for easier handling. Optional ingredients and adjunct ingredients may be added at any time.

Methods of Making Diluted Compositions from Concentrates

It is envisioned that the concentrated liquid compositions can be used as is, without dilution. It is also envisioned that the concentrated liquid compositions can be diluted prior to use, preferably with water, to a concentration of esterquat active of about 2% to about 22% by weight, preferably about 3% to about 8% by weight, based on the total weight of the diluted composition. Since some embodiments of the concentrated liquid compositions can easily be dispersed in water, it is contemplated that the dilution could be done by a consumer. Such use provides several advantages, such as reduced packaging needs (due to the concentrated product), and reduced energy needs for transportation, as well as reduced transportation costs, due to less water needing to be shipped.

It is also envisioned that a minimal amount of the solvent system could be used to make the esterquat flowable for transportation, such as an amount that provides a viscosity of about 5,000 cP or less at 25° C. The remainder of the solvent amount could then be added at the location where the fully concentrated liquid composition is to be made.

The concentrated liquid compositions of the present technology may also be shipped in concentrated form to a consumer product manufacturer location where equipment is not available for making conventional liposomal esterquat dispersions. Since some embodiments of the concentrated liquid compositions can be easily dispersed in water without high shear mixing or other specialized equipment, a consumer product manufacturer that does not have such equipment can easily produce a diluted product between 2 and 22% by weight active. In some embodiments, it may be useful to include ionizable salts when the concentrated liquid composition is diluted to a concentration of esterquat active that is higher than about 8% by weight of the diluted composition. The ionizable salts are typically used in more concentrated dispersions to lower or control viscosity and/or stabilize the diluted formula.

A wide variety of ionizable salts can be used in the diluted dispersion. Examples of suitable salts are the halides of the Group IA and IIA metals of the Periodic Table of the Elements, e.g., calcium chloride, magnesium chloride, sodium chloride, potassium bromide, and lithium chloride. The amount of ionizable salts used depends on the amount of active ingredients used in the compositions and can be adjusted according to the desires of the formulator. Typical levels of salts used to control the composition viscosity are from about 20 to about 20,000 parts per million (ppm), preferably from about 20 to about 11,000 ppm, by weight of the diluted composition. Optional or adjunct ingredients may also be added by the product manufacturer to make the final diluted product. Desirably, the concentrated liquid compositions of the present technology are stable concentrates, and if diluted prior to use, form stable liquid dispersions. A stable liquid concentrate or stable liquid dispersion is defined as one that does not phase separate or increase or decrease in viscosity by more than about 10% after four weeks of storage at 4° C. and 40° C. Desirably, the concentrated liquid compositions and diluted liquid dispersions are also shelf-stable. As used herein, "shelf-stable" means a composition that does not phase separate, or increase or decrease in viscosity by more than about 10% after 52 weeks of storage at temperatures likely to be encountered on a retail shelf, such as a temperature in the range of about 19° C. to about 30° C.

Product Use

The concentrated liquid compositions of the present technology can be used, for example, as concentrated liquid fabric softening compositions in the rinse cycle of a home washing machine. The concentrated liquid fabric softening compositions may be added directly in an undiluted state, for example through a dispenser drawer or, for a top-loading washing machine, directly into the drum. The amount of concentrated fabric softener added to the machine can be an amount sufficient to deliver about 1.5 g to about 8 g of esterquat active per wash load. Such an amount typically provides about 0.04% to about 0.3% by weight esterquat active to the fabric, based on the weight of the dry fabric. For example, in order to deliver 0.15% weight of the active esterquat on dry fabric (WOF), the dosage of a 50% active esterquat formula for a 6 pound (2721.55 g) load of dry laundry is 8.16 g: (0.15% WOF) (2721.55 g)/50%=8.16 g, where WOF stands for weight on dry fabric. The 0.15% WOF is based on a commercial premium fabric softener dosage for a medium sized load per bottle instructions.

In some embodiments, the concentrated fabric softening composition can be added as a liquid to the washing machine. In other embodiments, the composition may be dispensed as a fabric softening article, such as, but not limited to, a pod, a packet, a pouch, or a capsule. The fabric softening article has a water-soluble or water-rupturable coating or film that encapsulates or contains a unit dose of the concentrated fabric softening composition. The term "unit dose" as used herein refers to a pre-metered amount of fabric softening composition that should be delivered to a laundry solution to provide an effective amount of softening to a minimum amount of laundry articles in a minimum volume of laundry solution. For larger loads of laundry articles, multiple doses may be required for an effective amount of softening. Water-soluble or water-rupturable coatings or films are known in the art. Suitable materials for the coating or film include, but are not limited to, polyvinyl alcohol, polyvinyl pyrrolidone, methyl cellulose, hydroxymethyl cellulose, partially hydrolyzed vinyl acetate, gelatins, and combinations thereof.

Alternatively, the concentrated liquid fabric softening composition can be diluted prior to use, preferably with water, to a concentration of esterquat active of about 2% to about 22% by weight, preferably about 3% to about 8% by weight, based on the total weight of the diluted composition. Since some embodiments of the concentrated fabric softening compositions are readily dispersible, the dilution could be done by a consumer, or a consumer product manufacturer who does not have the high shear mixing or specialized equipment typically used to make conventional liposomal fabric softener dispersions.

The fabric softening composition (either concentrated or diluted) is added to the dispenser in an amount effective to soften and condition fabric articles under predetermined laundering conditions. The fabric softening composition can also be used in a hand washing laundry process, wherein the fabric softening composition is added to one or more rinse bath solutions for manually rinsing fabric articles in a hand washing laundry process. Alternatively, the composition may be used in a commercial automatic laundry operation.

The following examples will more fully illustrate the embodiments of the present technology. All parts, percentages and proportions referred to herein and in the appended claims are by weight unless otherwise illustrated. Physical test methods are described below.

EXAMPLES

Example 1

An esterquat was made as follows-canola fatty acid (283 g/mol, 2876.0 g, 10.1625 mol) and Antioxidant 1010 (1178 g/mol, 3.7 g, 0.003 mol) were added to a 5 L reactor equipped with mechanical stirring, nitrogen sparge and distillation capabilities. The Iodine Value of this fatty acid is 111. Stirring was initiated, the contents were heated to 35° C. and triethanolamine (149 g/mol, 977.03 g, 6.5572 mol) was added. The fatty acid to TEA ratio in this mixture 1.55:1. The reaction temperature was increased to 190° C. and held for 3.5 hr. After 3.5 hr, the reactor was cooled and the esteramine intermediate was transferred for quaternization and tested (Free Amine=1.77 meq/g, Total Acidity=0.06 meq/g).

The esteramine intermediate (564 g/mol, 3650.3 g, 6.5 mol) was added to a 5 L reactor equipped with mechanical stirring, nitrogen headspace sweep and reflux capabilities. Stirring and nitrogen sweep were initiated. The reaction temperature was adjusted to 50° C. and dimethyl sulfate (126 g/mol, 774.8 g, 6.1 mol) was added drop wise over one hour. Temperature was controlled to 85° C. max during the addition. Reaction was mixed for 1 hr at 85° C. Sodium chlorite, 25% (wt) (90.4 g/mol, 9.8 g, 0.03 mol) was added and mixed for 30 min. Product was collected and tested (Free Amine=0.08 meq/g, Cationic Actives=1.17 meq/g, Total Acidity=0.10 meq/g, Gardner Color=4.6). A slightly yellow paste was obtained. This esterquat is designated EQ1.

Example 2

Canola fatty acid (283 g/mol, 647.8 g, 2.289 mol), triethanolamine (149 g/mol, 171.0 g, 1.1477 mol) and Antioxidant 1010 (1178 g/mol, 0.82 g, 0.001 mol) were added to a 2 L reactor equipped with mechanical stirring, nitrogen sub-surface sparge and distillation capabilities. The Iodine Value of this fatty acid is 111, and the fatty acid to TEA ratio is 2.00:1. Stirring was initiated and the contents were heated to 75° C. Nitrogen sparge was started. The reaction temperature was then increased to 190° C. and held for 4.5 hr. After 4.5 hr, the reactor was cooled and the esteramine intermediate was transferred for quaternization and tested (Free Amine=1.48 meq/g, Total Acidity=0.05 meq/g).

The esteramine intermediate (675 g/mol, 753.7 g, 1.1 mol) was added to a 2 L reactor equipped with mechanical stirring, nitrogen headspace sweep and reflux capabilities. Stirring and nitrogen sweep were initiated. The reaction temperature was adjusted to 45° C. Dimethyl sulfate (126 g/mol, 130.5 g, 1.0 mol) was added drop wise over one hour. Temperature was controlled to 85° C. max during the addition. Reaction was mixed for 1 hr at 85° C. Product was collected and tested (Free Amine=0.09 meq/g, Cationic Actives=1.16 meq/g, Total Acidity=0.01 meq/g). A slightly yellow paste was obtained. This esterquat is designated EQ2.

Example 3

Distilled tallow fatty acid (272 g/mol, 1067.05 g, 3.9230 mol) and hydrogenated tallow fatty acid (272 g/mol, 409.89 g, 1.5069 mol) were added to a 3 L reactor equipped with mechanical stirring, nitrogen sub-surface sparge and distillation capabilities. The iodine value of this fatty acid mixture is about 34. Stirring was initiated and the contents were heated to 75° C. Triethanolamine (149 g/mol, 521.3 g, 3.4987 mol), Antioxidant 1010 (1178 g/mol, 2.0 g, 0.002 mol) and phosphorous acid (82 g/mol, 1.0 g, 0.01 mol) were added. The fatty acid to TEA ratio is 1.55:1. Nitrogen sparge was started. The reaction temperature was then increased to 190° C. and held for 4 hr. After 4 hr, the reactor was cooled and the esteramine intermediate was transferred for quaternization and tested (Free Amine=1.81 meq/g, Total Acidity=0.06 meq/g).

The esteramine intermediate (552 g/mol, 1836.0 g, 3.3 mol) was added to a 3 L reactor equipped with mechanical stirring, nitrogen headspace sweep and reflux capabilities. Stirring and nitrogen sweep were initiated. The reaction temperature was adjusted to 45° C. Dimethyl sulfate (126 g/mol, 381.8 g, 3.0 mol) was added drop wise over 30 minutes. Temperature was controlled to 85° C. max during the addition. Reaction was mixed for 1 hr at 85° C. Dimethyl sulfate (126 g/mol, 20.0 g, 0.2 mol) was added drop wise. Temperature was controlled to 85° C. max during the addition. Reaction was mixed for 1 hr at 85° C. Product was collected and tested (Free Amine=0.08 meq/g, Cationic Actives=1.16 meq/g, Total Acidity=0.17 meq/g). A waxy solid was obtained. This esterquat is designated EQ3.

Example 4

1,3-diethoxy-2-propanol (DEP) having a BCI of 100% can be synthesized by at least two methods. For one, sodium ethoxide can be reacted with 1,3-dichloro-2-propanol (dichlorohydrin) using ethanol as solvent as reported by Wills, et al. *J. Chem. Soc., Perkins Trans. I* 2002, 965-981. DOI: 10.1039/b111097g. Dilution of the reaction mixture with water to dissolve precipitated sodium chloride followed by extraction and column chromatography provides the product in moderate yield. Scheme 1 below shows the chemistry described. A modified version of this method was used to synthesize the DEP utilized in the Examples. Specifically, column chromatography was avoided by using filtration of the reaction mixture followed by distillation as the preferred method of isolation and purification.

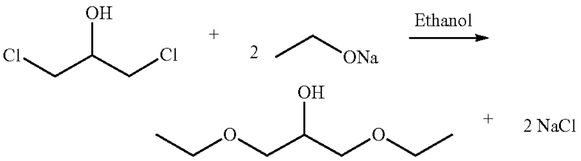

Scheme 1. Synthesis of DEP Using 1,3-dichlorohydrin as the Starting Material

A second method to produce DEP having a BCI of 100% involves the reaction of sodium ethoxide with epichlorohydrin as disclosed by Garcia, et al. Green Chem. 2010, 12, 426-434. DOI: 10.1039/b92331g. In this case, epichlorohydrin is added in a controlled manner to a solution of sodium ethoxide in ethanol. The first step in the reaction is attack of the sodium ethoxide on the epoxide ring, which opens the ring, and then the ring spontaneously closes on the opposite side to produce an ethoxy substituted epoxide. The second mole of sodium ethoxide then reacts with the newly formed epoxide ring to produce a deprotonated diethoxyl-2-propanol with a sodium counterion. The deprotonated diethoxy-2-propanol then removes a proton from the ethanol solvent to make the desired product plus a mole sodium ethoxide. Overall, two moles of sodium ethoxide reacting with epichlorohydrin only produces 1 mole of sodium chloride. Once the reaction is deemed complete, the reaction mixture is diluted with water, concentrated to remove volatiles, and then the product is isolated in good yield by column chromatography. Distillation could be used as a means to isolate the product and avoid column chromatography. The chemistry described is shown in Scheme 2.

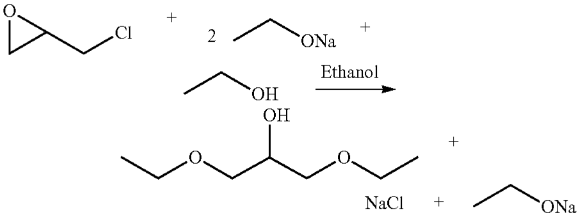

Scheme 2. Synthesis of DEP Using Epichlorohydrin as the Starting Material.

Scheme 2 is preferred since it produces only 1 mole of sodium chloride while scheme 1 produces 2 moles of sodium chloride.

For a 100% BCI version of DEP, the feedstocks employed must be naturally derived. Ethanol is commercially available as a grain based product, whereas, both 1,3-dichlorohydrin and epichlorohydrin can be obtained using Dow Chemical Company's glycerin to epichlorohydrin (GTE) process as described by Bell, et al., Clean 2008, 36 (8), 657-661. DOI: 10.1002/clen.200800067. The GTE process uses vegetable based glycerin as a starting material thus enabling the production of biorenewable 1,3-dichlorohydrin and epichlorohydrin with 100% BCI content.

Formulas in the examples that follow were made by adding solvent and water to a beaker followed by addition of esterquat. The mixture was then mixed for several minutes with an Ika benchtop mixer. The ingredients used when making formulas containing EQ1 were made at room temperature-none of the ingredients used to make the EQ1 formulas were heated before addition to the beaker and no heat was applied while the batch was being mixed. All formulas have a pH of 2.5 to 4.0. The pH is adjusted as needed to obtain a formula having a pH of 2.5 to 4.0.

A concentrated formula designated as a clear or transparent formula in the following examples is one having a percent transmittance of light of greater than about 50 using a 1 centimeter cuvette at a wavelength of 420 nanometers wherein the composition is measured in the absence of dyes and opacifiers at 25° C. Alternatively, transparency of the composition may be measured as having an absorbance (A) at 420 nanometers of less than about 0.3, which is in turn equivalent to percent transmittance of greater than about 50 using the same cuvette as above. The relationship between absorbance and percent transmittance is: Percent Transmittance=100 (1/inverse log A). A formula designated as unstable means that either the percent transmission at 420 nm was less than 50% and/or the formula was phase separated. "Phase separated" means separate layers can be detected visually. Unless indicated otherwise, viscosity measurements were taken at room temperature (25° C.) on a Brookfield DV-II+ viscometer using RVT spindle 4 at 50 RPM. Sample size was approximately 100 g in a 4 ounce jar.

Example 5

In this example, formulas were prepared to assess the dispersibility of the formula in water. Each formula comprised 50% by weight of EQ1 as the esterquat, 30% by weight solvent, and 20% by weight water. The formulas differed in the ratio of dimethyl lauramide/myristamide (CAA) and polyethylene glycol 200 (PEG 200) in the solvent. The formulas are shown in Table 1. Dispersibility of each formula in water was determined by the following test: 1 gram of the formula was added to an 8 ounce jar containing 120 ml of water, putting on the cap and vigorously shaking the mixture 10 times by hand. If there were no visibly discreet particles after shaking, the formula was deemed to be readily dispersible. The results are shown in Table 1. Unless indicated otherwise below, all the stable formulas were readily water dispersible. Formulas which were found to be stable but were deemed not readily dispersible due to visible particles could still be useful for making diluted formulas at manufacturing sites lacking equipment to make conventional liposomal dispersions but still having mixing capability. The visible, suspended particles of not readily dispersible formulas eventually disperse with more mixing than provided in the ready dispersibility test.

TABLE 1

| Ingredient | % Inclusion by Weight (Based on 100% Active) | | | | | | |
|---|---|---|---|---|---|---|---|
| EQ1 | 50 | 50 | 50 | 50 | 50 | 50 | 50 |
| Dimethyl lauramide/ myristamide (CAA) | 30 | 25 | 20 | 15 | 10 | 5 | |
| PEG 200 | | 5 | 10 | 15 | 20 | 25 | 30 |
| Water | 20 | 20 | 20 | 20 | 20 | 20 | 20 |
| Physical condition | Unstable | Unstable | Stable | Stable | Stable | Unstable | Unstable |

The results in Table 1 show that when CAA or PEG 200 was used as the only solvent, at an esterquat concentration of 50% by weight, the formula was not stable. Similarly, when the ratio of CAA to PEG 200 was 5:1 or 1:5, the formula was not stable. However, the formulas having a ratio of CAA to PEG 200 in the range of 2:1 to 1:2 were all stable. The results demonstrate that stability of the formula may depend on the ratio of solvents in the solvent mixture. The results also demonstrate that a mixture of solvents can provide formula stability, whereas the same solvents, used individually, can result in an unstable formula.

Example 6

This example evaluates the softening ability of a formula according to the present technology compared to a conventional esterquat dispersion. The formula in Example 5 with 15% CAA and 15% PEG was used for this example. This formula was dispersed in water to make a dispersion comprising 5% by weight esterquat active. A conventional liposomal dispersion comprising 5% by weight of EQ1 was used as a comparative. The conventional liposomal dispersion is prepared by slowly adding EQ1 into an appropriate amount of water with stirring over a period of about 3 to 10 minutes, applying heat if necessary to improve mixing and facilitate liposome formation, and then continuing mixing for about an additional 5 to 15 minutes after all the EQ1 has been added. Liposomes form during the mixing process to yield a 5% by weight liposomal dispersion of EQ1. The softening test method used is based on ASTM D-5237. White hand towels made from an 86/14 cotton/polyester blend were first subjected to a prewash process to remove any factory finish. For each test, 160 towels were washed in conventional household washing machines. Experimental fabric softener samples were dosed into the machines during the rinse cycle. Towels were then tumble dried and allowed to equilibrate to room temperature overnight. Panelists then blindly evaluated pairs of towels via a Paired Comparison panel test. The number of votes were tallied for each sample. Using the One-Sided Directional Difference Test (Meilgaard, M. C., Civille, G. V., Carr, B. T., Sensory Evaluation Techniques, 3rd Ed., CRC Press, 1999, pp. 277-278, 355, 371), in a 160-vote observation test one product would need to be chosen a minimum of 91 times to be deemed statistically superior to the other at the 95% confidence level.

Using this test method, the 5% esterquat active aqueous dispersion of the formula in Example 5 with 15% CAA and 15% PEG 200 was equivalent to the softening of the 5% EQ1 esterquat active conventional liposomal dispersion. The 5% dispersion of the formula from Example 5 was easily made by gently mixing the formula concentrate with water.

Example 7

Example 5 was repeated, except that EQ2 was used as the esterquat in each formula. EQ2 differs from EQ1 in that EQ2 has a fatty acid to TEA ratio of 2.00:1, whereas EQ1 has a ratio of 1.55:1. The formulas and results are shown in Table 2.

TABLE 2

| Ingredient | % Inclusion by Weight (Based on 100% Active) | | | | | |
|---|---|---|---|---|---|---|
| EQ2 | 50 | 50 | 50 | 50 | 50 | 50 |
| Dimethyl lauramide/ myristamide (CAA) | 30 | 20 | 15 | 10 | 5 | |
| PEG 200 | | 10 | 15 | 20 | 25 | 30 |
| Water | 20 | 20 | 20 | 20 | 20 | 20 |
| Physical condition | Unstable | Unstable | Unstable | Unstable | Unstable | Unstable |

Table 2 shows that all of the formulas were unstable, indicating that stability of the formula may be influenced by the fatty acid to TEA ratio used in making the esterquat. When using the PEG 200/CAA solvent system and a canola fatty acid-based esterquat (TEA/DMS), the results show that the ratio of fatty acid to TEA should be below 2.0 to obtain a stable dispersion.

Example 8

Example 5 was repeated using only the stable formulas from Example 5, and substituting EQ3 as the esterquat in each formula. EQ3 is made from a tallow fatty acid feedstock having an iodine value of 34, rather than the canola fatty acid feedstock used to make EQ1. The formulas and results are shown in Table 3.

TABLE 3

| Ingredient | % Inclusion by Weight (Based on 100% Active) | | |
|---|---|---|---|
| EQ3 | 50 | 50 | 50 |
| Dimethyl lauramide/myristamide (CAA) | 20 | 15 | 10 |
| PEG 200 | 10 | 15 | 20 |
| Water | 20 | 20 | 20 |
| Physical condition | Unstable | Unstable | Unstable |

Table 3 shows that the formulas were unstable, indicating that stability of the formula may also be influenced by the iodine value of the fatty acid feedstock used in making the esterquat. When using the PEG 200/CAA solvent system, the results show that the iodine value of the feed used to make esterquat should be above 34 to obtain a stable dispersion.

Example 9

Using a series of different solvents per the method described in the book Solubility Science, Principles and Practice, Steven Abbott, 2017, Creative Common NY-BD, the Hansen polarity parameter for EQ1 was measured to be 10.9, while the Hansen polarity parameter of EQ3 was measured to be 4.4. The Hansen solubility parameters are physicochemical parameters that can be used to predict the behavior of a given solvent or solute. These results show that, when using the PEG 200/CAA solvent system, the Hansen solubility parameter of the EQ should be above about 5.

Example 10

In this example, formulas were prepared with different amounts of esterquat to assess the effect of esterquat concentration on the stability of the formula. The formulas and results are shown in Table 4.

TABLE 4

| Ingredient | % Inclusion by Weight (Based on 100% Active) | | |
|---|---|---|---|
| EQ1 | 60 | 70 | 80 |
| Dimethyl lauramide/myristamide (CAA) | 15 | 15 | 10 |
| PEG 200 | 15 | 15 | 10 |
| Water | 10 | | |
| Physical condition | Stable | Stable | Unstable |

As shown in Table 4, at an esterquat concentration of 80% by weight, EQ1 with the PEG 200/CAA solvent system is unstable. The results show that the upper limit of esterquat in this composition should be below 80% by weight to obtain a stable composition. Although the 60% and 70% formulas in this example were stable, they were not readily water dispersible.

Example 11

A formula containing 50% EQ1/20% dipropylene glycol monomethylether (DPM)/10% CAA/20% water was found to be clear, stable and dispersible in water. It also was completely removed from the fabric softener dispenser drawer in a front loading machine when a regular cycle was run. The BCI for this solvent system, made up of DPM and CAA, is calculated as follows:

Total carbon atom contribution from DPM=(weight factor of 2)×(148.2 g/mol)×($6.022\times10^{23}$ molecules/mol)×(7 carbon atoms/molecule)=$1.249\times10^{27}$ carbon atoms all of which are from non-biorenewable sources.

Total carbon atom contribution from CAA=(weight factor of 1)×(234 g/mol)×($6.022\times10^{23}$ molecules/mol)×(14.5 carbon atoms/molecule)=$2.043\times10^{27}$ carbon atoms of which 86.2% are from biorenewable sources. This means, from CAA, the number of biorenewable carbons are $1.761\times10^{27}$ ($2.043\times10^{27}$ times 0.862) and the number of non-biorenewable carbons is $2.820\times10^{26}$ ($2.043\times10^{27}$ times 0.138).

The total number of carbon atoms is $3.292\times10^{27}$ and the BCI of the solvent system is:

$$BCI=100\times[(1.761\times10^{27})/(3.292\times10^{27})]=53.5$$

Example 12

In this example, the effect of varying the amounts of the solvents in the solvent system was evaluated. The following formulas were prepared:

50% EQ1/15% dipropylene glycol monomethylether (DPM)/15% CAA/20% water, and

50% EQ1/10% dipropylene glycol monomethylether (DPM)/20% CAA/20% water.

The concentration of solvent remained the same at 30%, but the amounts of DPM and CAA solvents were varied. The formulas were found to be unstable, even though the solvent components and total amount of solvent were the same as those used in Example 11. These results indicate that the relative amounts of solvents in a solvent system have an effect on the stability of the composition. The calculated BCI values for the solvent systems (DPM+CAA) of each of these formulations are 66.0 and 74.8, respectively.

Example 13

A formula containing 80% EQ1/20% 1,3-diethoxy-2-propanol (DEP) was found to be clear, stable and dispersible in water. It also was completely removed from the fabric softener dispenser drawer in a front loading machine when a regular cycle was run. BCI for DEP is 100. This example demonstrates that the concentrated fabric softening composition of the present technology can be prepared without water.

Example 14

A freeze/thaw stability comparison was done between two formulations which each contained 5% EQ1. The first was made via the traditional liposomal method while the second was made by diluting a concentrated formula containing 50% EQ1, 15% bio-based PEG-200, 15% NINOL® CAA and 20% water. The freeze/thaw stability testing method used is the following:

1. Prepare the samples, and transfer into storage container (e.g. 4-ounce jar)
2. Place the samples inside a −15° C. freezer
3. Leave the samples at −15° C. for 24 hours
4. Take samples out of the −15° C. freezer after 24 hours, and place them at room temperature
5. Let the samples thaw until they reach room temperature (6 hours is usually enough time)
6. Perform visual inspection on the samples for phase separation, thickening/gelling and non-uniformity/lumpiness For three freeze/thaw cycles, repeat the procedure three times.

The formula made by the traditional, liposomal route was thick and lumpy/non-uniform after one freeze/thaw cycle, while the 5% formula made by diluting the 50% concentrate maintained the same viscosity and was uniform/non-lumpy after 3 freeze/thaw cycles. Conventional liposomes fail freeze/thaw cycles because the liposomes “crack” during the freezing step. When they crack, they expose hydrophobic surfaces of the liposome which do not want to be exposed to the aqueous phase. Upon thawing, those hydrophobic surfaces are attracted to each other but stick together in a random, inter-liposomal way (i.e. not just recombining in an intra-liposomal, ordered way with their own cracked liposomes) so as to form large particles which lead to macroscopic thickening and lumpiness. Without being bound by theory, when the 5% dispersion is made by diluting the 50% concentrate, it may be that non-liposomal structures are formed—the presence of PEG-200 and NINOL® CAA may be involved in non-liposomal droplet formation. Alternatively, also not wishing to be bound by theory, it may be that the presence of PEG-200 and/or NINOL® CAA alters the nature of the liposomes, if liposomes are present, such that they do not catastrophically crack open upon freezing.

Example 15

Hydrolysis of ester linkages at elevated storage temperatures (50° C.) of two formulations containing EQ1 was tracked by NMR. The first was a concentrated formula containing 50% EQ1, 15% bio-based PEG-200, 15% NINOL® CAA and 20% water. The second was a 5% active EQ1 dispersion made by the conventional, liposomal approach. Percentages were normalized such that the total, by weight, of the TEA quat (no ester linkages), monoester quat (one ester linkage), diester quat (two ester linkages) and triester quat (three ester linkages) equaled 100%. After 9 weeks, the normalized weight percent of TEA quat (which has no ester linkages and is the final species formed in the hydrolysis process) in the concentrate was 8.2% while it was 20.2% for the conventional 5% formula. This shows that the hydrolysis rate is more than cut in half in the concentrate, which should lead to a longer shelf life versus a conventional, liposomal dispersion.

Example 16

A formula was made utilizing 70% by weight EQ1 and 30% by weight CAA. The formula was stable and readily water dispersible. This result was unexpected considering that, when 30% by weight CAA was used as the only solvent in a formula having a lower concentration of the same quat active (the 50% EQ1/30% CAA/20% water formula from Example 5 Table 1), the formula was unstable. That the formula containing the same concentration of the same solvent but a higher concentration of quat active can be stable, when the lower quat concentration formula was not, is surprising.

Example 17

Analogous formulas to that in Example 16 were made using either M-10 or M-8-10 in place of CAA. These formulas were also stable and readily dispersible.

Example 18

Further formulations found to be stable and readily dispersible are shown in

TABLE 5

| Ingredient | % Inclusion by Weight (Based on 100% Active) | | | | |
|---|---|---|---|---|---|
| EQ1 | 70 | 70 | 80 | 80 | 80 |
| M-10 | 15 | | 20 | 10 | |
| M-8-10 | | 15 | | | |
| MET-10U | | | | | 20 |
| PEG 200 | 15 | 15 | | 10 | |

The results from Examples 16-18 demonstrate that stable, highly concentrated (70-80 wt % active esterquat) compositions can be prepared using a solvent system comprising fatty acid amides alone, or in combination with polyethylene glycol.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

What is claimed is:

1. A clear, stable liquid composition comprising:

(A) from about 30% to about 80% by weight, based on the weight of the composition, of one or more esterquats, wherein the one or more esterquats are the quaternized reaction product of a fatty acyl source having an Iodine Value of 40 to 130, and an alkanolamine at a fatty acyl to alkanolamine molar ratio of about 1.0:1 to about 2.2:1;

(B) from about 20% to about 50% by weight, based on the weight of the composition, of a solvent system that is free of volatile organic solvents, wherein the solvent system is a mixture of one or more polyethylene glycols having a number average molecular weight between 130 and 700, and one or more fatty amides having the following general structure:

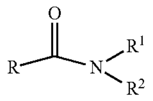

wherein R has from 6 to 20 carbon atoms, is branched or straight, saturated or has one or more double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present;

(C) optionally, 0 up to 30% by weight water;

wherein, the composition has a measured viscosity of less than 5000 cP at 25° C.

2. A clear, stable liquid composition comprising:

(A) from about 55% to about 85% by weight, based on the weight of the composition, of one or more esterquats, wherein the one or more esterquats are the quaternized reaction product of a fatty acyl source having an Iodine Value of 40 to 130, and an alkanolamine at a fatty acyl to alkanolamine molar ratio of about 1.0:1 to about 2.2:1;

(B) from about 15% to about 45% by weight, based on the weight of the composition, of a solvent system that is free of volatile organic solvents and is one or more fatty amides having the following general structure:

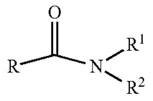

wherein R has from 6 to 20 carbon atoms, is branched or straight, saturated or has one or more double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present; and (c) optionally, 0 up to 10% by weight water;

wherein, the composition has a measured viscosity of less than 5000 cP at 25° C.

3. The composition of claim 1, wherein the fatty acyl source is derived from sunflower oil, canola oil, corn oil, cottonseed oil, flaxseed oil, peanut oil, meadowfoam oil, soybean oil, walnut oil, jojoba oil, palm oil, borage oil, safflower oil, or rapeseed oil, or mixtures thereof, preferably canola oil, LEAR rapeseed oil, or a combination thereof.

4. The composition of claim 1, wherein the alkanolamine is TEA, and the fatty acyl to alkanolamine ratio is about 1.3:1 to about 1.8:1.

5. The composition of claim 1, wherein the alkanolamine is MDEA, and the fatty acyl to alkanolamine ratio is about 1.0:1 to about 2.0:1.

6. The composition of claim 1, wherein the Iodine Value is 60 to 130.

7. The composition of claim 1, wherein the esterquat has a Hansen polarity parameter of greater than about 5.

8. The composition of claim 1, wherein the viscosity is less than 3000 cP at 25° C.

9. The composition of claim 1, wherein the polyethylene glycol comprises polyethylene glycol 200 (PEG 200).

10. The composition of claim 9, wherein the fatty amide comprises dimethyl lauramide/dimethyl myristamide.

11. The composition of claim 10, wherein PEG 200 and dimethyl lauramide/dimethyl myristamide are present in the mixture at a weight ratio of 1:3 to 3:1.

12. The composition of claim 1, wherein the esterquat comprises about 50% by weight, and the solvent system comprises about 30% by weight, based on the weight of the composition.

13. The composition of claim 1, wherein the solvent system has a total Biorenewable Carbon Index (BCI) of at least 90.

14. A fabric softener composition comprising water and the clear stable liquid composition of claim 1, wherein the one or more esterquats is present in the fabric softener composition at an actives amount in the range of 2 to 22 weight percent.

15. The fabric softener composition of claim 14, further comprising at least one ionizable salt.

16. A method of making a fabric softener composition comprising the steps of:

(A) providing a concentrated liquid fabric softening composition, wherein the concentrated liquid fabric softening composition comprises (i) from about 30% to about 80% by weight, based on the weight of the concentrated liquid fabric softening composition, of one or more esterquat actives, wherein the one or more esterquat actives are the quaternized reaction product of a fatty acyl source having an Iodine Value of 40 to 130, reacted with an alkanolamine at a fatty acyl to alkanolamine molar ratio of about 1.0:1 to about 2.2:1;

(ii) from about 20% to about 50% by weight, based on the weight of the concentrated fabric softening composition, of a solvent system that is free of volatile organic compounds, wherein the solvent system is a mixture of one or more polyethylene glycols having a number average molecular weight between 130 and 700, and one or more fatty amides having the following general structure:

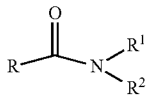

wherein R has from 6 to 20 carbon atoms, is branched or straight, saturated or has unsaturated double bonds, optionally containing one or more hydroxyl groups;

and $R^1$ and $R^2$ are independently hydrogen, a C1 to C6 alkyl group, or a C2 to C6 alkenyl group, optionally containing one or more hydroxyl groups and can optionally be branched when 3 or more carbon atoms are present and;

(iii) optionally, 0 up to 30% by weight water;

wherein, the concentrated liquid fabric softening composition has a measured viscosity of less than 5000 cP at 25° C.; and (B) mixing the concentrated liquid fabric softening composition in water to form a stable aqueous dispersion comprising from 2% to 22% by weight esterquat actives, based on the total weight of the dispersion, thereby forming the fabric softener composition.

17. The method of claim 16, further comprising the step of adding an ionizable salt.

18. The method of claim 16, wherein the polyethylene glycol comprises PEG 200.

19. The method of claim 16, wherein the fatty amide comprises dimethyl lauramide/dimethyl myristamide.

20. The method of claim 16, wherein the viscosity is less than 3000 cP at 25° C.

* * * * *